United States Patent [19]

de la Luz-Martinez et al.

[11] Patent Number: 5,553,532

[45] Date of Patent: Sep. 10, 1996

[54] APPARATUS FOR COOKING FOOD PRODUCTS USING VERY LOW AND LOW FREQUENCY RADIO WAVES

[75] Inventors: Jose de la Luz-Martinez, Puebla; Jesus Gonzalez-Hernandez, Mexico City; Feliciano Sanchez-Sinencio, Col. Tecamachalco; Juan de Dios Figueroa C., Valle Hermoso; Fernando Martinez-Bustos, Orizaba; Maximiano Ruiz-Torres, Morelia, all of Mexico

[73] Assignee: Centro de Investigacion y de Estudios Avanzados del I.P.N., Col. San Pedro Zacatesso, Mexico

[21] Appl. No.: 459,664

[22] Filed: Jun. 2, 1995

Related U.S. Application Data

[62] Division of Ser. No. 322,015, Oct. 11, 1994.

[30] Foreign Application Priority Data

Oct. 12, 1993 [MX] Mexico ................................. 936330

[51] Int. Cl.$^6$ ................................ A21D 8/00; H05B 6/00
[52] U.S. Cl. .......................... 99/358; 99/386; 99/443 C; 99/451; 99/DIG. 14; 219/388; 219/771; 219/776
[58] Field of Search .................... 99/443 C, 358, 99/443 R, 451, DIG. 14, 386; 426/523, 234, 237; 219/771, 776, 779, 388

[56] References Cited

U.S. PATENT DOCUMENTS

| | | | |
|---|---|---|---|
| 4,769,253 | 9/1988 | Willard | 426/559 |
| 4,974,503 | 12/1990 | Koch | 99/451 |
| 4,985,269 | 1/1991 | Irvin et al. | 426/560 |
| 5,277,924 | 1/1994 | Padilla | 219/776 |

FOREIGN PATENT DOCUMENTS

| | | |
|---|---|---|
| 104748 | 10/1970 | Mexico . |
| 123272 | 8/1973 | Mexico . |
| 125047 | 3/1974 | Mexico . |
| 135461 | 3/1977 | Mexico . |

OTHER PUBLICATIONS

Johnson, B. A., et al., "Tortilla–Making Characteristics of Micronized Sorghum and Corn Flours," *J. of Food Science*, vol. 45, 1980.

Tonella, M. L., et al., "Physical, Chemical, Nutritional and Sensory Properties of Corn–Based Fortified Food Products," *J. of Food Science*, vol. 48, 1983.

Holt, S. D., et al., "Formulation, Evaluation and Optimization of Tortillas Containing Wheat, Cowpea and Peanut Flours Using Mixture Response Surface Methodology," *J. of Food Science*, vol. 57, No. 1, 1992.

Industrial de Ensambles, S. A., Promotional Booklet re "Las Tortilladora 'Celorio', etc.", date unknown.

*Primary Examiner*—Timothy F. Simone
*Attorney, Agent, or Firm*—Rothwell, Figg, Ernst & Kurz

[57] ABSTRACT

Cooking of food products and particularly of dough-based food products such as corn tortillas is effected with a considerably reduced cooking time by applying to the uncooked food product very low and low frequency radio frequency waves simultaneously on both sides of the food product in order to quickly cook both surfaces of the same thus forming capping layers that retain a high degree of moisture within the body of the food product without unduly drying it. The radio frequency waves are preferably applied by an antenna formed by two parallel arrays of electrodes one on each side of the food product, the arrays of electrodes having alternate electrodes of opposite polarity to constitute dipoles which irradiate the radio frequency waves approximately parallelly to both sides of the food product.

5 Claims, 2 Drawing Sheets

APPARATUS FOR COOKING FOOD PRODUCTS USING VERY LOW AND LOW FREQUENCY RADIO WAVES

CROSS REFERENCE TO RELATED APPLICATIONS

Divisional of application Ser. No. 08/322,015, filed Oct. 11, 1994, pending.

BACKGROUND OF INVENTION

1. Field of Invention

The present invention refers to the techniques for cooking food products by the use of radio frequency waves and, more particularly, it is related to a method and an apparatus for cooking dough-based products, such as corn dough products (corn mesa products) and particularly corn tortillas, by the use of very low and low frequency radio frequency waves.

2 Description of the Prior Art

Corn-based food and snack products are very well known in the marketplace and ape generally made from several types of corn (maize) and mixtures of corn with other grains. These products include corn tortillas, corn chips, taco shells, corn tostadas, corn puffs, and the like, all of which are made from nixtamalized, rehydrated, and micronized corn dough. The corn mixtures with other cereal grains may include cornsorghum, corn-soybean, and corn-amaranth, as well as other grain-enriched corn dough mixtures, including multigrain mixtures. The term "corn dough" of "masa", as used in this application, means doughs made from corn whether or not they contain other grains or additives. Similarly, the term "corn products", as used in the instant application, means those products made from corn with or without other grains or additives.

Various methods for the preparation of a diversity of corn products are very well known in the prior art and are well documented in the literature, with some of them being proprietary techniques. The addition of flavorings, conditioners, as well as other additives and preservatives, and the choice of shape are also very well known and will depend on the characteristics desired for the product. These can serve to increase taste, nutritional values, shelf Life and appearance.

As all of the above mentioned products, particularly the corn products such as corn tortillas need to be suitably cooked, various methods for carrying out such cooking have been developed in the prior art. The oldest one of said methods, which at least in Mexico may be dated back in the Tenth century, uses a so called "comal", which is a relatively flat plate made from clay, metal or ceramic material, that was heated by burning wood, charcoal or other combustible materials available at the time. In this very ancient method, the corn products, particularly corn tortillas were shaped by hand to the desired form and placed on the comal for a period of time sufficient to cook the same, turning them over at predetermined intervals with the aim of producing a uniform cooking on both sides. Obviously, the traditional methods such as the one described above were generally batch processes.

In order to more clearly describe the type of cooking methods existent in the prior art the cooking of corn tortillas will be taken as an example of said cooking methods. Corn tortillas, which have been a traditional food product in several Latin American countries and that are becoming more and more popular in other North American and European countries, are round flat cooked pieces of corn dough the dimensions of which vary from one producer to the other. However, the preferred dimensions are 8 to 15 cm. in diameter, and 0.5 to 3 mm in thickness. The weight of corn tortillas is generally from 20 to 35 grams per piece. The moisture content of the uncooked corn dough used to make corn tortillas, usually ranges from 40 to 52% by weight.

During comal cooking the temperature range of the comal varies from 180° to 210° C. depending on the type of comal used. When placing the tortilla for the first time in thermal contact with the comal, there is a formation of a thin vapor impervious or capping layer (a few tenths of a millimeter thick) on the side of the tortilla in contact with the comal. This layer seals the corresponding side against vapor exhaustion. Usually, the time to produce said layer will depend on the moisture content of the product and on the cooking temperature of the comal, and ranges from 20 to 40 seconds. After this time has elapsed the tortilla is turned over to cook the other side. Cooking of the second side takes from 20 to 50 seconds. At this stage, another vapor impervious or capping layer (from 0.5 to 1.9 millimeters thick) is produced. The overall cooking of the tortilla is considered as complete once the product inflates (puffs). The degree of puffing of the tortilla during cooking, determines the efficiency of the cooking and the quality of the cooked tortilla. The capping layers are useful for retaining the correct moisture within the product and hence the overall quality needed for shelf life and handling purposes. At the end of the cooking time, moisture levels of the tortilla are reduced by from 12 to 8% by weight. The productivity of this batch type method depends on the number of tortillas able to fit on the comal at any given time, and on the thermal conductivity of the dough being cooked.

Besides the comal method described above as admitted prior art, industrial methods for continuously cooking corn tortillas have been described in several Mexican and U.S. patents. For instance, Mexican patent No. 15,798 issued during the year 1915 to Compañia La India, S. A. and no longer available and therefore mentioned here as admitted prior art, for the first time introduces the continuous cooking of tortillas by providing a vertical cylindrical oven heated by wood or the lime, with a manually rotatable circular cover on which the tortillas were placed, turned over and taken off by hand.

Mexican patent No. 19,628 issued during the year 1920 to C. Celorio et al, also not available and mentioned here as admitted prior art, introduces for the first time a rudimentary automatic machine for making corn tortillas, which uses conveyor belts running within a cooking tunnel heated by means of a plurality of gas burners.

During the year 1921 a machine using a plurality of rollers heated by means of internal gas oil burners was Launched to the Mexican market, without much success in view of the fact that it was extremely difficult to form the capping Layers between the several pairs of heating rollers through the nip of which the tortillas had to be passed.

Mexican patent No. 45,792 issued to Fausto Celorio during the year 1947, no longer available and mentioned here as admitted prior art, introduced for the first time the use of a conveyor belt Located within a cooking tunnel having a plurality of gas burners to heat the tortillas that continuously run through said tunnel on said belt. Although Celorio accomplishes a considerable improvement over the cooking methods and equipment prior to this invention, the machine still uses gas burners distributed along the path of the conveyor belt and the control of the temperature was not very efficient, whereby the percentage of discarded products used to be relatively high.

Mexican patent 104,748 issued to Fausto Celorio on Oct. 9, 1970, describes an improved cooking device which includes a series of conveyor belts having a series of burners for burning any type of fuel arranged under the stretches of the belts that transport the tortillas, and a series of perforated articulated rollers which improve the distribution of hot gases to evenly cook the tortillas. Although this machine constitutes a considerable improvement over the prior art, it still makes use of fuel burners, thus showing the same type of drawbacks shown by prior art devices, namely, difficult control of temperature throughout the device, long cooking times and occasional defective capping layers.

Mexican patent 123,272 issued to Fausto Celorio on Aug. 27, 1873, describes a cooking apparatus which includes air pre-heating means for pre-heating the air that is injected to the burners for providing oxygen for the combustion of the fuel, but without changing the principle of cooking the tortillas by means of the transportation thereof on conveyor belts to be heated by the burners.

Mexican patent 125,047 issued to Fausto Celorio on Mar. 11, 1987 describes a tortilla making machine that includes a novel take-off device for the individual tortillas but without changing the principle of cooking the tortillas on conveyor belts by means of gas burners or burners for other fuels.

Mexican patent 135,461 issued to Fausto Celorto on Mar. 16, 1977 describes an improved cooking chamber for cooking tortillas, said chamber being formed by a group of conveyor belts carrying the tortillas, the burners for gas or other fuel being arranged along the belts between the upper and lower stretches thereof, and the chamber being divided into a corresponding plurality of tunnels for forming isolated cooking sections for each conveyor belt, the partitions dividing said chamber running from the inlet end to the outlet end of said chamber and each partition being located such that each isolated cooking section includes the lower stretch of the upper belt and the upper stretch of the next lower belt. Although the capacity of production of this device is remarkably higher than that of the prior art cooking apparatus, it still preserves the same principle of cooking the tortillas with burners for fuel.

Johnson, B. A., Rooney, L. W. and Khan, M. N., Journal of Food Science, Volume 45, 1980, make reference to the cooking of corn tortillas on page 672, by stating that tortillas intended for immediate consumption and having capping layers are cooked on gas-heated griddles at a temperature of 315° C. whereas "taco tortillas", that is, unpuffed tortillas, are cooked on said gas-heated griddles at a temperature of 274° C., alternating sides at predetermined intervals. Again times of up to about 2 minutes have to be used and the problem of repeatedly turning over the tortillas to accomplish a uniform cooking is not eliminated.

Tonella, M. L., Sanchez, M. and Salazar, M. G., Journal of Food Science, Volume 48, 1983, also make reference to the cooking of tortillas on page 1638, but they go back to the traditional comal cooking method without suggesting any improvement over said very ancient method.

Holt, S. D., Resurreccion, A. V. A. and McWatters, K. H. Journal of Food Science, Volume 57, No. 1, 1992, describe on page 122 a method for cooking tortillas that comprises heating the tortillas on a non-stick electrically heated griddle at 190° C. for 3 minutes on each side, turning over the tortillas every 90 seconds during the cooking period and pressing each time with a metal spatula to remove air pockets. This cooking method, as reported by Holt et al, is intended for the obtention of taco-type tortilla, that is unpuffed tortilla, and of course the cooking time and the need of pressing the tortilla are factors that render said method absolutely uneconomical.

Finally, U.S. Pat. No. 4,769,253 issued to Willard, M. J. on Sep. 6, 1988 and U.S. Pat. No. 4,985,269 issued to Irvin, S. A., Fedor, R. A. and Merritt, C. G. on Jan. 15, 1991, both describe cooking methods for dough pieces to produce snacks or tortilla chips, which cooking methods include the frying of the dough and not the mere heating thereof, thus considerably departing from the purpose of obtaining good quality corn tortillas or the like.

None of the above mentioned references, therefore, suggests the cooking of the corn tortillas by the use of radio frequency energy, but rather use either electrical resistive heating or the traditional heating by combustion of common fuels, either directly or through the previous heating of air which is then passed through the cooking zone.

Although some of the prior art methods described above are satisfactory for producing the capping layers on the tortilla, all of said methods show the important drawback that the conservation of moisture in the final product is deteriorated. The capping layers of the tortillas acquire the same rough surface of the hot conveyor belts due to the thermal diffusion mechanism utilized during the cooking operation. Another important drawback of these methods is the poor thermal energy transfer between the hot conveyor belt and the product, resulting in a limited productivity. The low thermal conductivity of the dough and the amount of the thermal energy wasted in heating up the conveyor belts render these processes slow and inefficient.

To overcome the drawbacks shown by the methods involving direct contact heating from a comal or from a hot conveyor belt as discussed above, and with the aim of producing good sealed capping layers, others have explored the use of microwave radiation for heating the dough. This microwave radiation methods unfortunately tend to dry the shaped dough without cooking the outside satisfactorily and produce a hard, tasteless and brittle undesirable tortilla having an unappealing appearance. In view of these discouraging results, the use of high frequency radiation has been disclosed by others not as a method of making tortillas but rather as a method for drying dough for purposes other than the production of soft edible dough products.

In view of the rather unsatisfactory results shown by the direct heating methods for the cooking of dough-based products such as corn tortillas and the unsuccessful intended use of high frequency radiation (microwaves) for said purpose, for long an effective cooking method has become indispensable, which will overcome the above described drawbacks shown by the prior art methods of cooking this type of products, particularly corn tortillas, which method has not been found prior to the advent of the present application.

SUMMARY OF THE INVENTION

Having in mind the defects of the prior art methods and apparatus for cooking corn dough based products, it is an object of the present invention to provide a method for cooking food products, particularly corn dough based products, and still more particularly corn tortillas, which will considerably reduce the cooking time without however decreasing the quality of the product.

Another object of the present invention is to provide a method for cooking food products, of the above described character, which will avoid the use of direct heating of the product by means of burners or the like.

One other and more particular object of the present invention is to provide a method of cooking food products, of the above mentioned character, which will permit the use of radio frequency energy for the cooking operation and yet will be sufficiently mild to produce soft and appealing cooked products.

One other and more particular object of the present invention is to provide a method of cooking food products, of the above mentioned character, which will very quickly cook the products without excessive drying of the same.

Still another object of the present invention is to provide an apparatus for cooking food products with very low and low frequency radio waves, which will be of a very simple and economical construction and yet will provide a high efficiency and speed of cooking of the food products, without unduly drying same.

Other object of the present invention is to provide a method for the selection of an optimal radio frequency band, based on measurements of the dielectric properties of the dough, which will provide a means for carrying out the method of cooking in the most efficient manner.

The foregoing objects and others ancillary thereto are preferably accomplished as follows:

According to a preferred embodiment of the present invention, a method of cooking food products comprises:

a) Preparing a dough from meal or flour of the food product;

b) Cutting and shaping the dough into pieces of predetermined size and thickness;

c) Generating radio frequency waves of very low and low frequency to be irradiated within a cooking space for the food product;

d) Selecting an optimal frequency band of said radio frequency waves depending on the moisture content and the shape desired for the cooked food product; and e) Passing the uncooked food product through said cooking space at a predetermined speed in order to produce the desired degree of cooking of the same.

BRIEF DESCRIPTION OF THE DRAWINGS

The novel features that are considered characteristic of the present invention are set forth with particularity in the appended claims, The invention itself, however, both as to its organization and its method of operation, together with additional objects and advantages thereof, will best be understood from the following description of preferred embodiments when read in connection with the accompanying drawings, in which:

DESCRIPTION OF PREFERRED EMBODIMENTS

Figure 1:
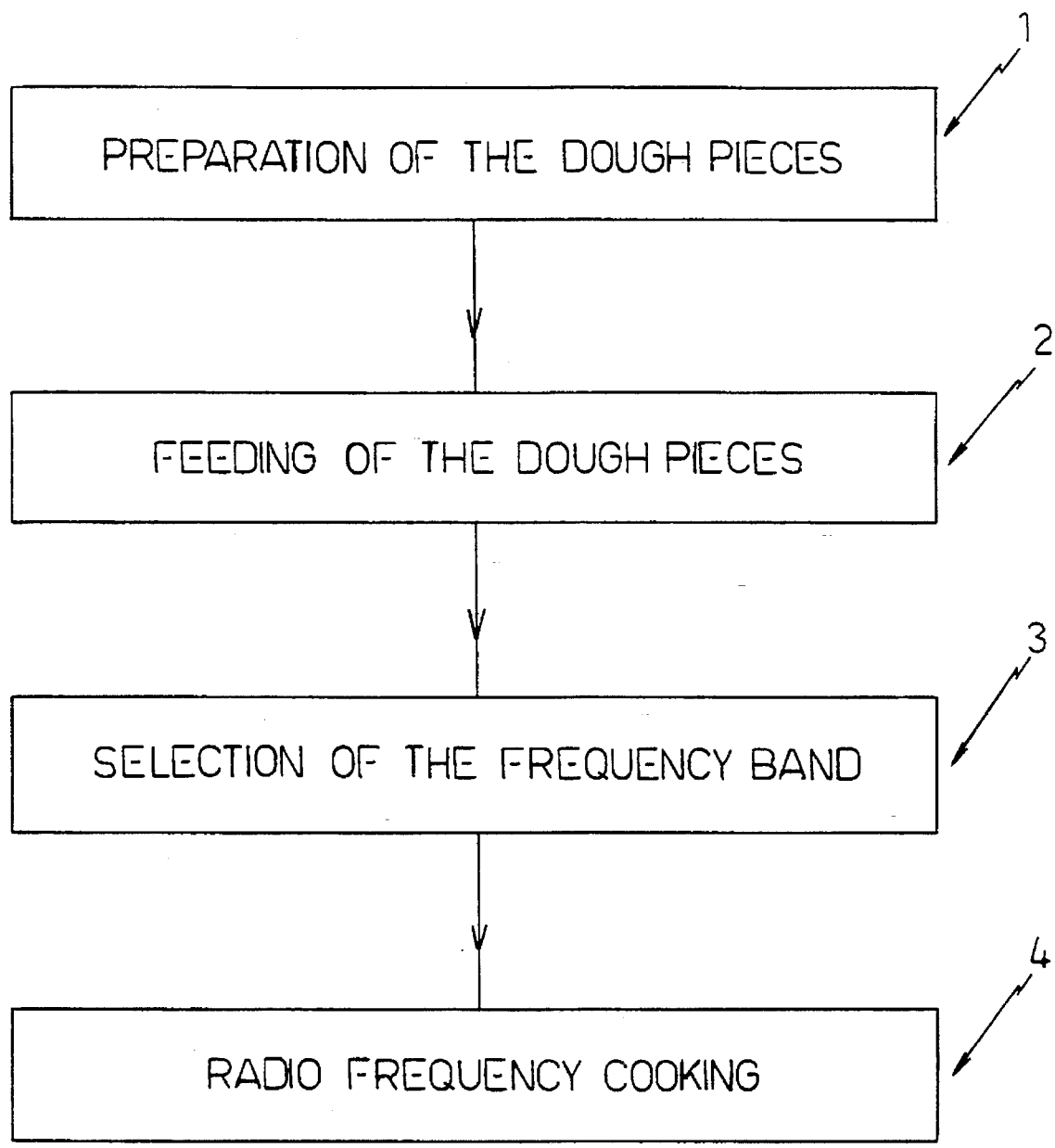
FIG. 1 is a block diagram showing the essential steps of the process in accordance with the present invention for cooking food products.

The method of the present invention that will be described in detail hereinafter, unexpectedly overcomes the drawbacks shown by all of the methods of the prior art discussed above. It has been discovered that there are frequency band and antenna configurations that allow the radio frequency energy to be beamed onto the dough in a predetermined pattern to accelerate the cooking of the food product, and that if the cooking of corn tortillas is specifically considered, antennas can also be configured to very quickly cook the outside surfaces thereof, thus easily generating the customary vapor impervious capping layers on both sides of the tortilla early in the cooking process, in order to prevent excessive drying.

It is to be stressed that with the method of the present invention, satisfactory food products can be produced in approximately 10% of the time required for the direct heating or microwave heating methods of the prior art. The method of the present invention is based on the use of very low and low radio frequency energy for cooking food products, particularly corn products and still more specifically corn tortillas in a much shorter time but with the production of products having equal or superior quality than those cooked by the conventional direct heating or microwave heating process.

The method of the present invention can be most efficiently carried out by selecting a particular very low/low frequency radio wave band which will depend on the dielectric characteristics of the product, for application to the said products by means of an antenna which is suitably designed for cooking tortillas or other food products quickly and without excessive drying. The selection of said particular frequency band is based on measuring the dielectric properties of the dough that must be cooked for obtaining the desired food product, as will be described in more detail hereinafter.

Although the method of the present invention may be used for cooking any type of food products, it is particularly efficient for cooking food products derived from a dough and, still more particularly, for cooking food products based on corn dough or masa, such as corn tortillas. Therefore, the following detailed description of preferred embodiments of the method of cooking of the present invention will be mainly referred to corn dough products, although it must be understood that the method of the present invention can be equally used for cooking other types of food products. For any of the corn dough products to be cooked, several previous steps must be carried out to optimize the speed and energy required in the cooking process.

The dough to be cooked must be prepared in such a way that it contains all additives, grains and other ingredients required. For the preparation of a predetermined uncooked dough product, any methods known to those skilled in the art can be used. Next, the dough products must be shaped in the desired geometry. For instance, when dealing with corn tortillas, the traditional round and flat shape is generally obtained with any suitable presses, apparatus or methods also known to those skilled in the art.

As already mentioned above the selection of an appropriate frequency band of the very low and low frequency radio waves to be applied on the dough products for the cooking of the same, heavily depends on the dielectric properties of the dough or masa. For corn dough based products, for instance, the dissipation factor possesses several maxima if a broad frequency range is investigated. At frequencies close to DC level, an anomalous behavior of the dissipation factor is observed, although such behavior is not relevant, due to the fact that the testing electrodes (contacts), interact irreversibly with the product. For low audio frequencies (up to a few KHz), and specifically below 1000 Hz, there is a sequence of maxima that change in frequency with temperature, probably due to free ions present in corn mixtures or to starch gelatinization. More specifically, in the instance of uncooked corn tortillas prepared from nixtamalized corn dough (masa) or dough made with dehydrated corn flour, it has been found that the most suitable and therefore preferred frequency band for use in the cooking of this type of corn tortillas is of from 10 to 100 KHz, in view of the fact that the position of the maximum dissipation factor within these frequencies is essentially independent of the temperature. For dough mixtures of different compositions, other maxima may exist within the range of a few KHz or possibly a few MHz. The important feature to be considered for efficiently dielectrically cooking food products by radio frequency (RF) waves is to determine the frequency band within which the dissipation factor of the dough is relatively independent from changes in the temperature, since otherwise the RF wave absorption by said product will be low and therefore the cooking process would be rendered inefficient.

The power requirements of the very low/low frequency radio frequency (VLF/LF RF) generator must be chosen according to the weight, the amount of moisture to be removed, the temperature increase desired, and the time selected to cook the product, In order to determine the RF power requirements for the RF generator, it must be assumed that the uncooked tortilla is a preferably heterogeneous mixture of corn material and water. By finding out the moisture content of the product, the effective relative permitivity of said product may be determined by means of effective media theories known to those skilled in the art. In particular, for corn tortillas with 40% by weight of moisture content, the preferred values of the relative permitivity are from 40 to 60. Since the cooking method for tortillas is a dehydration process, enough RF energy must be delivered to the product to heat it up to the boiling point of water and also sufficient RF energy must be supplied to evaporate from 8 to 12% by weight of water therefrom. The preferred RF energy levels for cooking corn tortillas in accordance with the present invention varies from 70 to 200 Joules per gram of product and the frequency band is of from 10 to 100 KHz, with residence times of from 5 to 15 seconds per tortilla piece.

In order to satisfy the desired characteristics of handling and appearance of the final product, the total moisture content in the uncooked product must be controlled to the desired level. Usually these levels vary from product to product. However, in accordance with the present invention, it has been found that a preferred moisture content range of from 40 to 52% by weight is quite suitable for an efficient RF cooking of the product.

The corn tortillas are exposed for cooking to the above described frequency band of VLF/LF radio wave radiation, by placing them on a continuous conveyor belt which passes between a suitable number of antenna radiators which will be described in detail hereinbelow. Next, the frequency band, the phasing of the electrodes, and the power level of the RF energy are set in order to allow the formation of both carping layers on the product before total cooking of the tortilla is completed. Under these conditions, the tortilla is cooked within a period of time of from 5 to 10 seconds.

The configuration of the cooking apparatus (antenna), must be such that the VLF/LF RF fields will have a homogeneous electromagnetic field distribution along the product and such that the said distribution be suitable to the thin and round geometry of the tortilla, so that the same may be evenly cooked.

During the cooking stage of corn tortilla products, a fast heating of both surfaces is essential for retaining a suitable moisture level inside the tortilla. Thus, the RF electromagnetic fields must be beamed parallelly to both surfaces of the uncooked dough, which is accomplished by the use of a special antenna configuration. An array of lineal dipoles having suitable dimensions to permit the electromagnetic fields to be beamed parallelly to both sides of the tortilla, and with a radiation pattern controlled by means of the VLF/LF RF emission phase of said dipoles is considered to be the preferred embodiment of the present invention. Also, in view of the fact that the frequency band which has been found to be most efficient for cooking flat products such as corn tortillas is of from 10 to 100 KHz, the VLF/LF radio generator must be preferably tuned to a frequency within said frequency band, with preferred RF energy levels of from 70 to 200 Joules per gram of product. The most important stage of the VLF/LF radio wave cooking process is to allow the RF fields to heat up only and cook the outermost thin layers of the dough, in order to create moisture retaining capping layers on both faces of the product and thus avoid dehydration of the innermost layers of the tortilla before they reach the water evaporation temperature during the final stages of the cooking cycle.

As already described above, the preferred frequency band of VLF/LF radio waves for cooking corn tortillas lies between 10 and 100 Khz and it appears that the reason why the cooking operation works efficiently within this frequency band is related to the fact that the dielectric dissipation factor for corn dough or masa is large within this range and does not change substantially in amplitude and frequency with temperature up to about 110° C. Thus, in order to use the method of the present invention for cooking other food products, the dielectric properties of such other products must be determined and particularly the dissipation factor, which is the tangent of the ratio of the refraction index to the relative permitivity, within a suitable range of frequencies and temperatures. Methods to obtain the dissipation factor are standard methods known to those skilled in the art of dielectric materials. The dielectric losses must be preferably determined within a frequency range of from a few Hertz to several Megahertz, typically from 10 Hz to 300 MHz. This measurement is repeated at various temperatures from room temperature up to the value in which the food product is known to be cooked. In particular, and according with this invention, for corn tortillas the maximum temperature considered is around 100° C. Plotting the dissipation factor of the food products versus frequency for each temperature, several maximum values of the dissipation factor will be observed. For a fast cooking of the selected food product, it is necessary to select a frequency at which the dissipation is a maximum. The selected maximum must be independent or practically independent of temperature in the temperature range selected.

For cooking specific food products, the determination of the antenna configuration, either for batch or continuous production, is a function of the specific geometry of the product. Therefore, the antenna configuration of the present invention is suitable only for those products having the specific geometry described above, that is, the above described linear dipole array may be regarded as the most efficient array for those food products in which the geometry is that of a flat product, such as tortillas. Also, it has been found that said antenna configuration is highly efficient for cooking other food products having a relatively flat shape, such as wheat flour tortillas, as well as slices of meat, bread or cheese, sliced or chopped vegetables, potato chips, and the like. However, for cooking products with irregular and invariable shapes other than planar, a different antenna configuration which matches the product geometry must be designed in accordance with the above.

Having now more particular reference to the accompanying drawings, an embodiment of the method and the apparatus of the present invention will be described as exemplified by the cooking of corn dough tortillas, although it must be understood that this is only illustrative but not limitative of the scope of the present invention. FIG. 1 shows a block diagram illustrating the flow chart of a method for cooking corn dough tortillas. As diagrammatically shown in said figure, the method in accordance with the present invention essentially comprises a dough preparation step 1, a dough feeding step 2, a frequency band selection step 3, and a radio frequency cooking step 4.

The dough is prepared as indicated in step 1 by the mixing and homogenizing of the corn flour and the appropriate additives with the desired amount of water to provide a suitable moisture content, and then cutting and shaping the dough into piece, of the desired shape. The moisture content is one of the critical features of the method of the present invention, as already mentioned above. Knowledge of said factor determines, in a later step, how a correct phasing of the dipoles and RF power level must be set to produce capping layers during the tortilla cooking step, With the correct amount of additives, moisture content, and shape, the dough is fed to a suitable belt conveyor according to step 2. The properties of the material with which the conveyor is built must be such that it will be able to withstand high and rapidly changing electric fields with low RF dissipation, and such that it will also be able to withstand the cooking temperatures of the product. In step 3 an appropriate frequency band is selected for generating a suitable very low and low frequency radio frequency energy to be applied to a cooking zone through which the product is to be passed. The selected frequency band, as already mentioned above, will depend on the nature of the food product to be cooked, In the case of the preferred embodiment of the present invention, namely, the method for cooking corn tortillas, the frequency band is selected for cooking the product such that the two desired capping layers are created. Finally, in step 4 the dough pieces are passed through a cooking zone where a suitable level of very low and low frequency RF energy is applied to said pieces for a time sufficient to cook the same.

Figure 2:
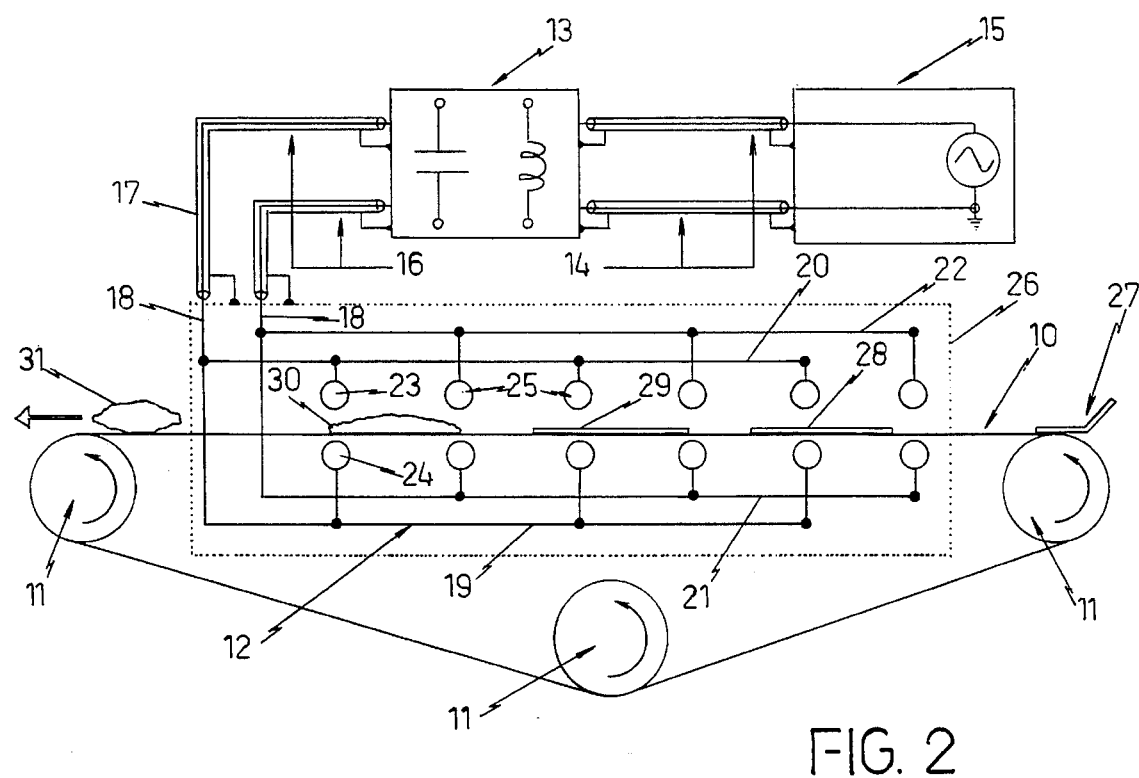
FIG. 2 is a diagrammatic cross sectional elevational view of an apparatus according to the present invention.

FIG. 2 shows a preferred embodiment of an apparatus for VLF/LF RF cooking of food products. The apparatus built in accordance with this embodiment of the invention is highly suitable for cooking corn tortillas or other flat food products and essentially comprises a conveyor belt 10 threaded around and driven by a plurality of rollers 11, an antenna generally designated by the reference numeral 12 which comprises a specially arranged dipole electrode configuration, a radio frequency power coupling transformer 13, and a radio frequency energy generator 15.

The previously prepared and shaped pieces 27 of corn dough if corn tortillas are to be cooked or of other types of doughs if other flat food products are to be cooked, are fed to the conveyor belt 10. The conveyor belt 10 carries the uncooked pieces of dough 27 through a cooking zone in which a plurality of specially arranged capacitive electrodes forming dipoles 25 is installed as will be described in more detail hereinbelow. At this stage a radio frequency field generated by the radio frequency energy generator 15 is applied to the product through the RF power coupling transformer 13, by means of the capacitive electrodes 23 and 24 of the antenna or dipole configuration 12. The generator 15 for producing the RF field is preferably a variable frequency RF generator, the power requirements of which will vary depending on the amount of material to be cooked.

One of the critical features of the apparatus in accordance with the present invention is the configuration of the electrodes 23 and 24 for forming the antenna identified by the general reference numeral 12, since as mentioned above, said configuration will depend on the nature and characteristics of the product to be cooked. For cooking tortillas or food products having similar flat shapes, said antenna 12 preferably comprises two linear arrays of conductors, namely, one array 19, 21 located below the conveyor belt 10 and another array 20, 22 located above the conveyor belt 10, for carrying the RF current to the corresponding arrays of electrodes, one lower array of electrodes 24 and one upper array of electrodes 23. The distance between the arrays of electrodes can be varied according to the dimensions of the product to be cooked. Each consecutive pair of electrodes in an array form a dipole such as that illustrated at 25 in FIG. 2 of the drawings.

The electrodes 23 and 24 are supported by a low dissipation or non dissipative frame (not shown) and each electrode is made of a suitable dielectric material such as glass, fiber glass, TEFLON, high density polymer, printed circuit boards, ceramics and the like. The whole antenna system 12 is enclosed in a faraday box 26, which is a normally made of aluminum wire mesh, in order to minimize radio frequency interference emission to the exterior of the cage 26.

The wire connections 14 between the radio frequency energy generator 15 and the coupling transformer 13, as well as the wire connections 16 between the coupling transformer 13 and the antenna 12 are made of coaxial cables in order to match impedances and avoid any radio frequency interference. The outer cables 17 of said connections are grounded as shown in FIG. 2, whereas the inner cables 18 carry the radio frequency signals between the different described parts of the apparatus.

The radio frequency energy carrying cable 18 of one of the poles of the coupling transformer 13, as clearly shown in FIG. 2, is bifurcated into lines 19 and 20, with line 19 extending under the conveyor belt 10 and line 20 extending above the conveyor belt 10. Similarly, the radio frequency energy carrying cable 18 of the opposite pole of the coupling transformer 13 is bifurcated into lines 21 and 22, with line 21 extending under the conveyor belt 10 and line 22 extending above the conveyor belt 10. The upper electrodes 23 are alternately connected one to line 20 and the next one to line 22 and so forth in order to constitute the dipoles 25. Similarly, the lower electrodes 24 are alternately connected one to line 19 and the next one to line 21 and so forth in order to form similar dipoles, with which an arrangement of said dipoles is obtained which irradiate the radio frequency waves in a direction approximately parallel to the surfaces of the food product. It is because of this arrangement that the surfaces of the food product are rapidly heated to form the two capping layers as shown at 28 and 29, to thereafter inflate the upper capping layer as shown at 30 and finally to inflate the lower capping layer or puff the product as shown at 31.

The present invention may be more clearly understood in the following example, which is given without any intention to restrict the invention, since said example must be regarded as merely illustrative but non limitative of the scope of this invention.

EXAMPLE

Freshly made, hydrated corn dough was prepared by mixing commercial instant corn flour with water in a 1:1.25 ratio. The moisture content was determined by weighing a portion of the dough before and after dehydration at 50° C. For 2 hours. The total moisture content for the mixture was 42% by weight. The dough was converted into tortillas that is, into round and flat pieces of dough. For cooking the tortillas they were deposited on a continuous conveyor belt made of fiber glass covered with TEFLON to minimize radio frequency dissipation and the products were passed through the cooking zone of the cooking apparatus described in the specification and illustrated in FIG. 2 hereof. A frequency band between 38 and 45 KHz was used for irradiating the radio frequency energy to cook the dough.

The radio frequency energy was irradiated on the dough by means of two linear arrays of 30 dipoles facing each other, each electrode having a length of 20 cm and a diameter of 0.3175 cm, and a distance of separation of 5 cm was used for each dipole. The electrodes for each array were round and made from a brass alloy of approximately 60% copper and 40% zinc. Plating of electrolytic copper was made on such electrodes to permit a high radio frequency wave conductivity within said selected frequency band. The electrodes were supported by a frame of TEFLON material having dielectric properties such that the dissipation of the cooking radio frequency energy was less than 1%. The spacing between each dipole array was selected to allow an homogeneous cooking of the products and the radio frequency power emitted by the radio frequency wave generator illustrated in FIG. 2 was fixed at 500 Watts.

Under the above described conditions the cooking time for the corn tortillas was of 5 seconds, after which time a completely puffed soft and flexible tortilla was produced.

Although certain specific embodiments of the present invention have been shown and described above, it is to be understood that many modifications thereof are possible. The present invention, therefore, is not to be restricted except insofar as is necessitated by the prior art and by the spirit of the appended claims.

What is claimed is:

1. An apparatus for cooking food products comprising:

a) a radio frequency generator which generates radio frequency waves of variable frequency;

b) a coupling transformer connected to said radio frequency generator;

c) a cooking compartment arranged within a radio frequency nondissipitive cage which avoids radio frequency interference;

d) a food product conveyor arranged to transport the food products through said cooking compartment;

e) a variable speed drive mechanism coupled to said food product conveyor; and f) an antenna arranged within said cooking compartment and connected to said coupling transformer, said antenna irradiating said radio frequency waves evenly on the two sides of said food products when the food products are conveyed through the cooking compartment by the food product conveyor.

2. An apparatus according to claim 1, wherein said radio frequency nondissipitive cage comprises a metal wire mesh surrounding said antenna, said radio frequency nondissipitive cage avoiding radio frequency dissipation towards the environment.

3. An apparatus according to claim 1, wherein said food product conveyor comprises a conveyor belt of a material having a very low radio frequency dissipation factor.

4. An apparatus according to claim 1, wherein said antenna comprises two parallel linear arrays of electrodes, one array disposed on each side of the food products being conveyed through the cooking department by said food product conveyor, each one of said arrays having alternate opposite plurality electrodes next to each other forming dipoles, and providing an irradiation of said radio frequency waves which is approximately parallel to both sides of the food product.

5. An apparatus according to claim 4, wherein said dipoles have a length approximately equivalent to the length of the food products.

* * * * *